United States Patent
De Jong (10) Patent No.: US 7,273,169 B2
(45) Date of Patent: *Sep. 25, 2007

(54) SECURE PHOTO CARRYING IDENTIFICATION DEVICE, AS WELL AS MEANS AND METHOD FOR AUTHENTICATING SUCH AN IDENTIFICATION DEVICE

(75) Inventor: Eduard Karel De Jong, Amsterdam (NL)

(73) Assignee: Sun Microsystems, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/967,282

(22) Filed: Oct. 19, 2004

(65) Prior Publication Data

US 2005/0077351 A1   Apr. 14, 2005

Related U.S. Application Data

(63) Continuation of application No. 10/148,830, filed as application No. PCT/NL99/00749 on Dec. 7, 1999, now Pat. No. 6,883,716.

(51) Int. Cl.
*G06K 5/00* (2006.01)

(52) U.S. Cl. ................. 235/380; 235/375; 235/487

(58) Field of Classification Search ......... 235/380, 235/375, 382, 492, 487, 488; 902/5–7; 382/115–118, 382/232; 340/5.4–5.42
See application file for complete search history.

(56) References Cited

U.S. PATENT DOCUMENTS

| 4,425,642 A | 1/1984 | Moses et al. |
| 4,582,985 A * | 4/1986 | Lofberg ................. 235/380 |
| 4,694,396 A | 9/1987 | Weisshaar et al. |
| 4,757,495 A | 7/1988 | Decker et al. |
| 4,853,522 A | 8/1989 | Ogasawara |
| 4,874,935 A | 10/1989 | Younger |

(Continued)

FOREIGN PATENT DOCUMENTS

DE   4126213   2/1993

(Continued)

OTHER PUBLICATIONS

Sun Microsystems, Inc., "Java Card Runtime Environment (JCRE) 2.1 Specification," Final Revision 1.0, Feb. 24, 1999.

(Continued)

*Primary Examiner*—Thien M. Le
*Assistant Examiner*—Edwyn Labaze
(74) *Attorney, Agent, or Firm*—Finnegan, Henderson, Farabow, Garrett & Dunner, L.L.P.

(57) ABSTRACT

Means and a method for authenticating a photographic image (3) on an identification device (1), the identification device (1) being provided with: a photographic image of a person (3) and a microprocessor (8), the microprocessor (8) having: a) a processor (7), b) a memory (9) connected to the processor (7) and having stored authentication data, and c) interface means (5) connected to the processor (7) for communicating with an external device, wherein said photographic image (3) comprises stegano-graphically hidden information, the content of which together with said authentication data allows authentication of said photographic image (3), the method having the following steps: a') scanning the photographic image (3) and generating image data. b') analyzing these image data in accordance with a predetermined image analysis procedure to derive said hidden information, and c') carrying out the authentication of the photographic image (3) based on the hidden information and the authentication data.

30 Claims, 3 Drawing Sheets

U.S. PATENT DOCUMENTS

| | | | |
|---|---|---|---|
| 4,921,278 A | 5/1990 | Shiang et al. | |
| 4,930,129 A | 5/1990 | Takahira | |
| 4,953,160 A | 8/1990 | Gupta | |
| 5,057,997 A | 10/1991 | Chang et al. | |
| 5,148,546 A | 9/1992 | Blodgett | |
| 5,177,768 A | 1/1993 | Crespo et al. | |
| 5,204,663 A | 4/1993 | Lee | |
| 5,204,897 A | 4/1993 | Wyman | |
| 5,283,885 A | 2/1994 | Hollerbauer | |
| 5,365,576 A | 11/1994 | Tsumura et al. | |
| 5,404,377 A | 4/1995 | Moses | |
| 5,446,901 A | 8/1995 | Owicki et al. | |
| 5,452,431 A | 9/1995 | Bournas | |
| 5,453,602 A | 9/1995 | Hanada | |
| 5,469,559 A | 11/1995 | Parks et al. | |
| 5,479,509 A | 12/1995 | Ugon | |
| 5,481,715 A | 1/1996 | Hamilton et al. | |
| 5,511,176 A | 4/1996 | Tsuha | |
| 5,517,645 A | 5/1996 | Stutz et al. | |
| 5,534,372 A | 7/1996 | Koshizuka et al. | |
| 5,544,246 A | 8/1996 | Mandelbaum et al. | |
| 5,594,227 A | 1/1997 | Deo | |
| 5,649,118 A | 7/1997 | Carlisle et al. | |
| 5,657,379 A | 8/1997 | Honda et al. | |
| 5,721,781 A | 2/1998 | Deo et al. | |
| 5,742,756 A | 4/1998 | Dillaway et al. | |
| 5,754,649 A | 5/1998 | Ryan et al. | |
| 5,764,763 A | 6/1998 | Jensen et al. | |
| 5,768,385 A | 6/1998 | Simon | |
| 5,781,723 A | 7/1998 | Yee et al. | |
| 5,790,489 A | 8/1998 | O'Connor | |
| 5,802,519 A | 9/1998 | De Jong | |
| 5,832,119 A | 11/1998 | Rhoads | |
| 5,838,814 A * | 11/1998 | Moore | 382/115 |
| 5,862,117 A | 1/1999 | Fuentes et al. | |
| 5,869,823 A | 2/1999 | Bublitz et al. | |
| 5,881,152 A | 3/1999 | Moos | |
| 5,884,316 A | 3/1999 | Bernstein et al. | |
| 5,889,868 A | 3/1999 | Moskowitz et al. | |
| 5,894,550 A | 4/1999 | Thiriet | |
| 5,896,393 A | 4/1999 | Yard et al. | |
| 5,905,798 A | 5/1999 | Nerlikar et al. | |
| 5,905,819 A * | 5/1999 | Daly | 382/284 |
| 5,912,453 A | 6/1999 | Gungl et al. | |
| 5,915,027 A | 6/1999 | Cox et al. | |
| 5,930,363 A | 7/1999 | Stanford et al. | |
| 5,940,363 A | 8/1999 | Ro et al. | |
| 6,005,940 A | 12/1999 | Kulinets | |
| 6,052,690 A | 4/2000 | De Jong | |
| 6,055,615 A | 4/2000 | Okajima | |
| 6,058,483 A | 5/2000 | Vannel | |
| 6,094,656 A | 7/2000 | De Jong | |
| 6,104,812 A * | 8/2000 | Koltai et al. | 380/51 |
| 6,168,207 B1 | 1/2001 | Nishizawa | |
| 6,173,391 B1 | 1/2001 | Tabuchi et al. | |
| 6,182,158 B1 | 1/2001 | Kougiouris et al. | |
| 6,212,633 B1 | 4/2001 | Levy et al. | |
| 6,219,439 B1 * | 4/2001 | Burger | 382/115 |
| 6,220,510 B1 | 4/2001 | Everett et al. | |
| 6,241,153 B1 | 6/2001 | Tiffany, III | |
| 6,250,555 B1 | 6/2001 | Inamoto | |
| 6,257,486 B1 | 7/2001 | Teicher et al. | |
| 6,257,490 B1 | 7/2001 | Tafoya | |
| 6,292,874 B1 | 9/2001 | Barnett | |
| 6,295,313 B1 | 9/2001 | Noma et al. | |
| 6,310,956 B1 | 10/2001 | Morito et al. | |
| 6,311,186 B1 | 10/2001 | MeLampy et al. | |
| 6,311,280 B1 | 10/2001 | Vishin | |
| 6,321,981 B1 * | 11/2001 | Ray et al. | 235/380 |
| 6,325,285 B1 * | 12/2001 | Baratelli | 235/380 |
| 6,345,104 B1 * | 2/2002 | Rhoads | 382/100 |
| 6,349,336 B1 | 2/2002 | Sit et al. | |
| 6,374,355 B1 | 4/2002 | Patel | |
| 6,385,645 B1 | 5/2002 | De Jong | |
| 6,480,831 B1 | 11/2002 | Cordery et al. | |
| 6,480,935 B1 | 11/2002 | Carper et al. | |
| 6,484,946 B2 | 11/2002 | Matsumoto et al. | |
| 6,535,997 B1 | 3/2003 | Janson et al. | |
| 6,546,112 B1 | 4/2003 | Rhoads | |
| 6,572,025 B1 * | 6/2003 | Nishikado et al. | 235/494 |
| 6,608,911 B2 * | 8/2003 | Lofgren et al. | 382/100 |
| 6,742,712 B1 * | 6/2004 | Kawaguchi et al. | 235/492 |
| 6,748,533 B1 * | 6/2004 | Wu et al. | 713/176 |
| 6,808,118 B2 * | 10/2004 | Field | 235/494 |
| 6,866,196 B1 * | 3/2005 | Rathus et al. | 235/462.15 |
| 6,978,035 B2 * | 12/2005 | Kawaguchi et al. | 382/100 |
| 6,990,588 B1 * | 1/2006 | Yasukura | 713/186 |
| 2004/0060976 A1 * | 4/2004 | Blazey et al. | 235/375 |
| 2005/0087604 A1 * | 4/2005 | Nguyen et al. | 235/487 |
| 2005/0129334 A1 * | 6/2005 | Wilder et al. | 382/305 |
| 2005/0135656 A1 * | 6/2005 | Alattar et al. | 382/100 |

FOREIGN PATENT DOCUMENTS

| | | |
|---|---|---|
| DE | 4242247 A1 | 6/1994 |
| DE | 19600081 | 7/1997 |
| EP | 0 190 733 | 8/1986 |
| EP | 0 466 969 | 1/1992 |
| EP | 0 581 317 A2 | 2/1994 |
| EP | 0 666 550 | 8/1995 |
| EP | 0 674 295 A1 | 9/1995 |
| EP | 0 723 226 A1 | 7/1996 |
| EP | 0 251 861 A1 | 1/1998 |
| EP | 0 849 734 A2 | 6/1998 |
| EP | 0 864 996 A2 | 9/1998 |
| EP | 0 893 752 A1 | 1/1999 |
| EP | 0 917 152 A1 | 5/1999 |
| FR | 2776153 | 9/1999 |
| JP | 01277993 A | 11/1989 |
| JP | 02156357 A | 6/1990 |
| JP | 05089303 A | 4/1993 |
| JP | 09326046 A | 12/1997 |
| JP | 200015886 | 1/2000 |
| JP | 2001052143 A * | 2/2001 |
| JP | 2001126046 | 5/2001 |
| JP | 2001126046 A * | 5/2001 |
| WO | WO87/07062 | 11/1987 |
| WO | WO89/02140 | 3/1989 |
| WO | WO94/10657 | 5/1994 |
| WO | WO97/41562 | 11/1997 |
| WO | WO98/19237 | 5/1998 |
| WO | WO98/37526 | 8/1998 |
| WO | WO99/16030 | 4/1999 |
| WO | WO99/35791 | 7/1999 |
| WO | WO99/38162 | 7/1999 |

OTHER PUBLICATIONS

Tetsushi, Hikawa and Yukihiro, Ukai, "Storage Medium and Storage Medium Driving Device," Patent Abstracts of Japan, JP 11161551 (Jun. 18, 1999).

"Sun Microsystems Announces JAVACARD API," Business Wire, Oct. 1996.

Chan, "Infrastructure of Multi-Application Smart Card," http://home.hkstar.com/-alanchan/papers/multiApplicationSmartCard/, Jul. 25, 2002.

Cordonnier, et al., "The Concept of Suspicion: A New Security Model for Identification Management in Smart Cards, "http://inforge.unil.ch/isdss97/papers/48.htm, (1997).

Daniels, John et al., "Strategies for Sharing Objects in Distributed Systems," JOOP, Object Designers Ltd., Uk., pp. 27-36, no date provided.

Gong, L et al., "Going Beyond the Sandbox: An Overview of the New Security Architecture in the JavaDevelopment Kit 1.2" Proc. Usenix Sym, Internet Technologies and Systems, Dec. 8, 1997.

Islam, et al, "A Flexible Security Model for Using Internet Content," IBM Thomas J. Watson Research Center Papers, 'Online!', Jun. 28, 1997, from http://www.ibm.com/java/education/flexsecurity.

Java Card Applet Developer's Guide, Revision 1.12, Aug. 19, 1998, Sun Microsystems, Inc.

K. Matsui, et al., "Video-Steganography: How to Secretly Embed a Signature in a Picture," IMA Intellectual Property Project Proceedings, vol. 1, Issue 1, pp. 187-206 (Jan. 1994).

Lee, Chan Y., "Detecting Out-Of-Range-References," http://127.0.0.1:8080/vtopic/isapi?action+Views&VdkVgwKev=%2@2E%Fdata%2F1 993%2F, Jul. 24, 2002.

Philips Semiconductor, "Designers Offered First 16-Bit Smart Card IC Architecture with Development Tools," Press Release, Jul. 25, 2002.

Ritchey, Tim, "Advanced Topics: The Java Virtual Machine, "Javal, Chapter 14, pp. ii-x and 325-346, Sep. 22, 1995.

Sun Microsystems, Inc., "Java Card 2.0 Application Programming Interfaces," Oct. 13, 1997, Revision 1.0 Final.

Sun Microsystems, Inc., "Java Card 2.0 Language Subset and Virtual Machine Specification," Oct. 13, 1997, Revision 1.0 Final.

Sun Microsystems, Inc., "Java Card 2.0 Programming Concepts," Oct. 15, 1997, Revision 1.0 Final.

Sun Microsystems, Inc., "Java Card Runtime Environment (JCRE) 2.1 Specification—Draft 2," Dec. 14, 1998.

* cited by examiner

SECURE PHOTO CARRYING IDENTIFICATION DEVICE, AS WELL AS MEANS AND METHOD FOR AUTHENTICATING SUCH AN IDENTIFICATION DEVICE

RELATED APPLICATION

This is a continuation of Application No. 10/148,830, filed Sep. 23, 2002 now U.S. Pat. No. 6,883,716, which is the 35 U.S.C. 371 national phase of International Application No. PCT/NL 99/00749, filed on Dec. 7,1999, which designated the United States, and are incorporated herein by reference in their entirety.

FIELD OF THE INVENTION

The present invention relates to a photo carrying identification device, like pass-ports, and (credit) cards used to identify persons, and thereafter authorize them to do a predetermined action, like entering a building, passing a boarder, carrying out an automatic debit transaction from an account, etc.

BACKGROUND OF THE INVENTION

The invention relates to the use of identification (ID) documents equipped with a picture of a document's holder, e.g., a driver's license, or a plastic card having the size of a credit card, or a passport. In a common use of such an ID document, a human operator compares the picture on the document with the face of the document holder to assess entitlements sought by the document's holder based on credentials as defined by additional data in the document. A passport, for instance, gives access to a country based on nationality of the document's holder.

A problem encountered with such documents is that they are frequently copied with false credentials or a false picture.

A common solution to this problem is the application of physical tamper detection methods such a sealing foil covering both the picture and the document, often combined with special inspection tools, like polarized light, to probe the tamper detection method. However, the use of such inspection tools often requires a skilled operator.

Another possible solution, referred to in paragraph [0002] of EP-B1-0.539,439, to tampering with the picture attached to the ID document is in using smart cards provided with a microprocessor having a processor and a memory. The memory in the card chip stores a digital copy of the picture on the card. A terminal is provided to read the content of the memory of the chip card and to display the stored image on a monitor to an operator. Then, the operator compares the displayed image on the monitor with the face of the actual card holder. This solution may even obviate the need to attach the picture on the card itself. However, this solution requires costly display equipment which, amongst other reasons, has made this solution unsuitable in particular areas of industry which offers great potential to the use of smart cards, such as public transit systems where ID smart cards are sought as efficient improvement of traditional discount passes.

A further problem encountered in ID systems is in protecting the privacy of the individual using the ID document. Especially in case such an ID document is realized as an electronically readable smart card protection may be required from uncontrolled and/or unapproved collection of data identifying the individual and his or her use of the smart card.

To protect the privacy of the card holder, cryptographic techniques, e.g., blind signatures, may be applied to the process of reading ID and credential data from the smart card. However, the use of pictures stored in a card memory and read by a terminal for display on a monitor to an operator in principle defeats such cryptograpnic privacy protection. In such a case, the terminal is not only able to collect uniquely and strongly identifying data about individuals, i.e. their pictures, but also the nature of this data poses an additional threat in which, for instance, the individual may be compromised through digital image manipulation techniques.

U.S. Pat. No. 5,748,763, column 58, line 24, to column 62, line 45, describes a method and an arrangement for enhancing the security of credit and debit cards. The arrangement disclosed has a computer arranged for receiving a digital image of the card holder. After having analyzed the digital image the computer generates a snowy image which is generally orthogonal to the digital image and adds this to the digital image to render an amended, unique image. The intended effect is to "texturize" the original digital image. It is not necessary that the snowy image itself is invisible to a person looking at the image. However, the image of the card holder may not be obscured by the snowy image. The amended, unique image is printed on the card. Moreover, tile unique information is also stored in a central accounting network.

In a steganographic embodiment the snowy image is such that it is hidden in the photographic image of the person on the card. More detailed information as to steganography can be found in U.S. Pat. No. 5,613,004 and the references cited in this document. For the sake of the present invention steganography will be understood to relate to any method of obscuring information that is otherwise in plain sight. The information is hidden in another medium. It is used as an alternative to encryption. E.g., spreadsheets or graphics files could contain a text message invisible to an unaware person. People unaware of the hidden information will not recognize the presence of steganographically hidden information even if the information is in plain view.

In U.S. Pat. No. 5,748,763, referred to above, a scanner is provided to scan the card when the card holder wishes to use his card for a predetermined transaction, e.g., automatic payment from his account to pay for a product. The scanner is connected to the central accounting network. By means of a secure communication protocol the image of the card scanned by the scanner is transmitted to the central network. The central network is arranged to receive the transmitted information and to authenticate the validity of the image on the card.

Additional security to the known system may be provided by requesting the card holder to input a PIN during the scanning process. Moreover, additional security is provided by letting a third party, during the scanning process, check whether or not the person trying to carry out a transaction with the card is the person who's photo is on the card.

A disadvantage of the system and method disclosed by U.S. Pat. No. 5,748,763 is that it is only to operate when a central network is provided having stored all unique images of all participating cards.

SUMMARY OF THE INVENTION

A first object of the invention is to provide a photo carrying identification device that obviates the need for such a central network.

Therefore the invention provides an identification device provided with:
- a photographic image of a person and
- a microprocessor,
- the microprocessor comprising:
  - a processor,
  - a memory connected to the processor and comprising authentication data and
  - interface means connected to the processor for communicating with an external device;

wherein the photographic image comprises steganographically hidden information, the content of which together with the authentication data allows authentication of the photographic image.

Thus, the invention provides an identification device which are provided with a microprocessor, comprising the authentication data necessary to authenticate the photographic image on the identification device. In other words, the key to authenticate the photographic image is in the identification device itself instead of in a central network.

Such an identification device may be, for instance, a passport or a plastic identification card, like a smart card.

In one embodiment of the invention the processor is arranged to carry out at least part of the authentication. To that effect the processor will carry out a program preferably stored in the memory of the microprocessor.

The authentication data stored in the memory of the microprocessor may be a part of the photographic image on the identification device. However, it may also be data related to the photographic image. For instance, it may be related to grey level, intensity distribution, or image entropy of the photographic image.

A second object of the invention is to provide a terminal, which is arranged to communicate with the identification device of the invention to allow carrying out the authentication process required.

In a first embodiment the invention therefore provides a terminal arranged to communicate with an identification device, the identification device being provided with:
- a photographic image of a person and
- a microprocessor,
- the microprocessor comprising:
  - a processor,
  - a memory connected to the processor and comprising authentication data, and
  - interface means connected to the processor for communicating with a external, wherein the photographic image comprises steganographically hidden information, the content of which together with the authentication data allows authentication of the photographic image,
- the terminal being provided with:
  - a picture scanner to scan the photographic image and to generate image data,
  - a terminal interface allowing communication with the processor of the identification device, and
  - an image processor arranged
    - to receive the image data,
    - to analyze these image data in accordance with a predetermined image analysis procedure to derive the hidden information,
    - to receive the authentication data from the memory, and
    - to carry out at least part of the authentication of the photographic image based on the authentication data and the hidden information.

In this first embodiment, the authentication of the photographic image is either partly or entirely carried out by the image processor in the terminal.

The steps necessary to carry out said authentication will, in practice, be stored in a terminal memory. In an embodiment of the invention, the way in which these steps are carried out depends on the authentication data received from the memory of the identification device. In such an embodiment, the authentication carried out by the terminal will depend on data received from the identification device itself. This makes it impossible to predict the actual authentication steps carried out by the terminal, which enhances the security.

However, the security can also be enhanced in an alternative embodiment in which the processor of the identification device itself carries out at least part of the authentication of the photographic image. Therefore, the invention also provides a second embodiment of the terminal. This second embodiment terminal is arranged to communicate with an identification device, the identification device being provided with:
- a photographic image of a person and
- a microprocessor,
- the microprocessor comprising:
  - a processor,
  - a memory connected to the processor and comprising authentication data, and
  - interface means connected to the processor for communicating with a terminal, wherein the photographic image comprises steganographically hidden information, the content of which together with the authentication data allows authentication of the photographic image, the processor being arranged to carry out at least part of the authentication of the photographic image,
- the terminal being provided with:
  - a picture scanner to scan the photographic image and to generate image data,
  - a terminal interface allowing communication with the processor of the identification device, and
  - an image processor arranged
    - to receive the image data,
    - to analyze these image data in accordance with a predetermined image analysis procedure to derive the hidden information, and
    - to transmit at least the hidden information to the processor to allow the processor to carry out the at least part of the authentication of the photographic image.

Moreover, the invention relates to a method for authenticating a photographic image on an identification device, the identification device being provided with:
- a photographic image of a person and
- a microprocessor,
- the microprocessor comprising:
  - a processor,
  - a memory connected to the processor and comprising authentication data, and
  - interface means connected to the processor for communicating with an external device, wherein the photographic image comprises steganographically hidden information, the content of which together with the authentication data allows authentication of the photographic image, the method comprising the following steps:
scanning the photographic image and generating image data,
analyzing these image data in accordance with a predetermined image analysis procedure to derive the hidden information, and
carrying out the authentication of the photographic image based on the hidden information and the authentication data.

Finally, the invention relates to data carriers provided with a computer program and to computer programs as such for such a method.

Hereinafter, the present invention will be illustrated with reference to some drawings which are intended to illustrate the invention and not to limit its scope.

DETAILED DESCRIPTION OF THE EMBODIMENTS

Figure 1:
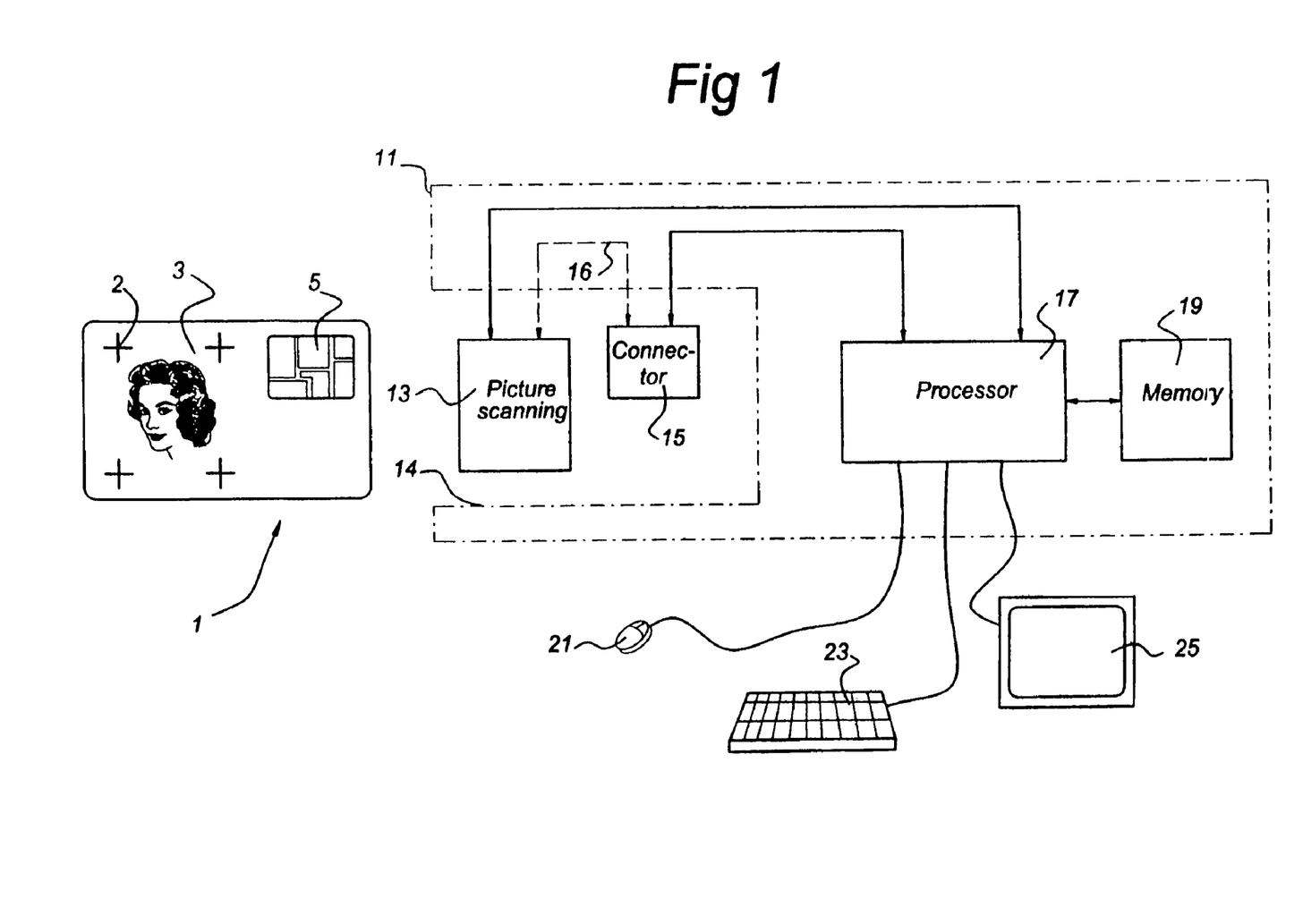
FIG. 1 is a schematic drawing of the system according to the invention showing a smart card and a terminal.

FIG. 1 shows a smart card 1 provided with a photographic image 3 of the card holder. The smart card 1 is provided with an interface 5 shown to be made of metallic pads. However, the interface 5 may have any other form, e.g., an antenna hidden within the smart card 1 allowing for contactless communication with an external device.

Figure 2:
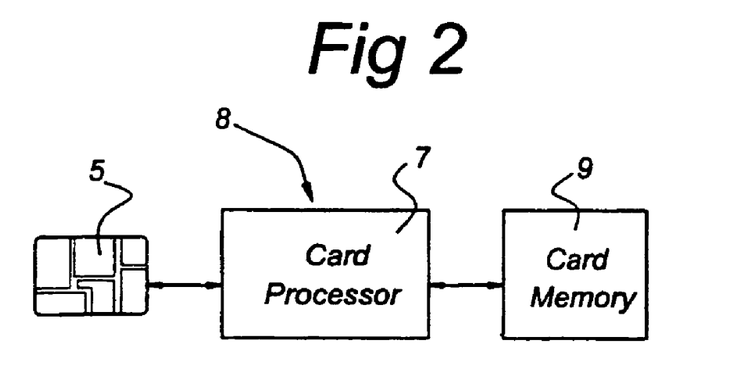
FIG. 2 shows the functional units of the microprocessor of the smart card in a schematic way.

As shown in FIG. 2, the interface 5 is connected to a card processor 7 which is also connected to a card memory 9.

Returning now to FIG. 1, the smart card 1 is, preferably, provided with one or more orientation signs 2 assisting a scanner during scanning the photographic image 3, as will be explained hereinafter.

It is observed that FIG. 1 shows a smart card 1 but that the invention is equally applicable for other types of documents having a photographic image of the document holder and a processor arranged to communicate with an external device.

The smart card 1 may be inserted into and removed from an opening 14 in a terminal 11. The terminal 11 is provided with a picture scanner 13 and a connector 15.

The picture scanner 13 is arranged such that it may scan the photographic image 3 either during insertion of the smart card 1 into the opening 14 or after the smart card 1 has been inserted entirely in opening 14.

The connector 15 will contact the interface 5 of the smart card 1 when the smart card 1 has been inserted entirely in the opening 14. Of course, when interface 5 is designed in another form, e.g. an antenna, the connector 15 is to be replaced by another type of interface arranged to communicate with interface 5.

The picture scanner 13 is connected to a processor 17 which is also connected to the connector 15 and to a memory 19.

FIG. 1 also shows some input means, like a mouse 21, and a keyboard 23, allowing an operator to input data to the processor 17. A monitor 25 connected to the processor 17 is provided to allow the processor to display necessary information to the operator. Of course, any other kind of display means may be provided instead of or in addition to monitor 25.

In an alternative embodiment of the terminal shown in FIG. 1, the processor 17 is provided as a processing unit within the picture scanner 13. Then, the picture scanner 13 is directly connected to connector 15 (or any other interface) by a direct link indicated with reference sign 16.

Figure 3:
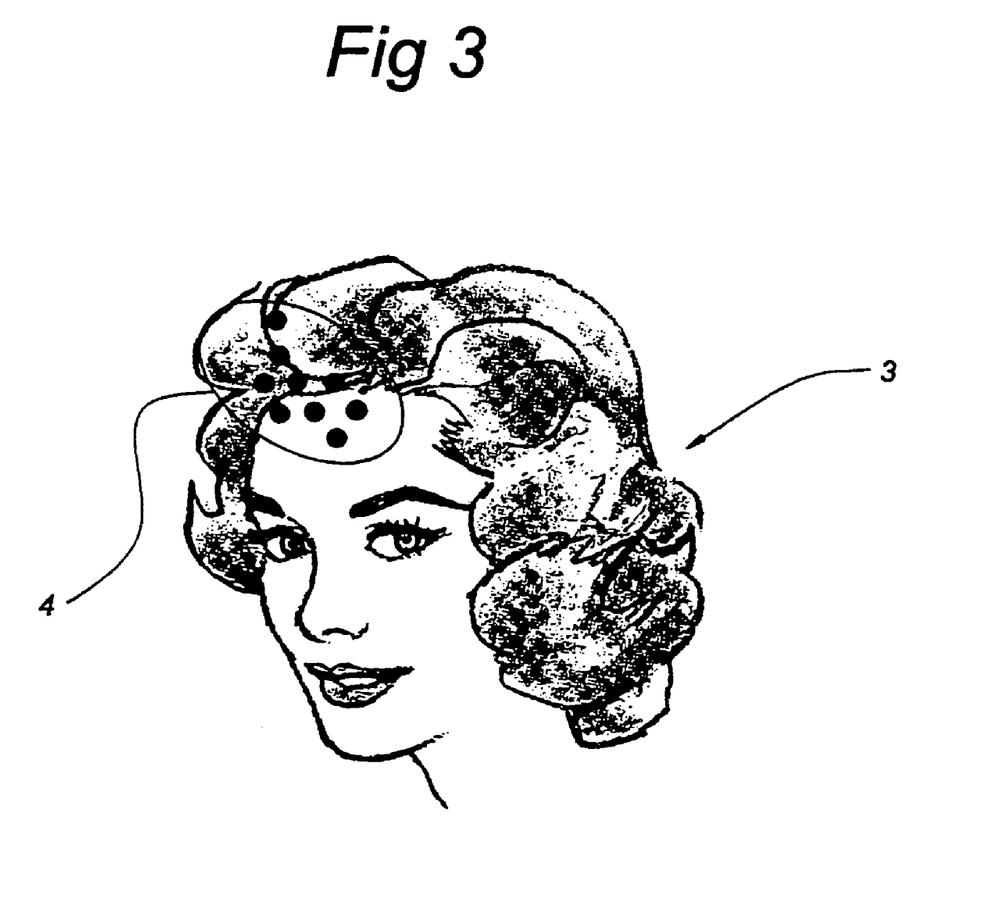
FIG. 3 schematically shows how information can be hidden in a photographic image.

FIG. 3 schematically shows that the photographic image 3 is provided with additional information 4. The additional information 4 is added to the photographic image 3 such that it is invisible to the human eye. Moreover, the additional information 4 may have such small dimensions that it is virtually impossible to be detected by automatic scanners if they do not know where to look for the additional information. The additional information 4 is added to the photographic image 3 by using steganographic techniques which are known to persons skilled in the art.

It is observed that, in FIG. 3, the additional information 4 is shown on such an enlarged scale that it is visible but in practice it will not be visible to the human eye. Moreover, in a preferred embodiment, the individual dots of information 4 are distributed over the entire image 3 to make it more difficult to find them.

The additional information 4 may have no relation at all to the content of the photographic image 3. However, the photographic image 3 before being printed on the smart card 1 may be preprocessed in such a way that the additional information 4 is calculated in dependence on the content of the photographic image 3 such that the degree to which it is hidden in the photographic image 3 is as best as possible.

In accordance with the present invention, the card memory 9 is provided with authentication data. The content of this authentication data, together with the hidden information 4 allows authentication of the photographic image 3.

In its simplest form, the authentication data has a one to one relation to the hidden information 4. However, the hidden information 4 may be present within the photographic image 3 in cryptographically processed form, e.g., it may be provided with a cryptographic signature such that the validity of the hidden information 4 can only be checked by an apparatus knowing the key to the cryptographic signature. Such a key is, then, stored in the card memory 9.

The hidden information 4 is such that it can be recognized by digitization of the photographic image 3 even if it is incomplete or otherwise impaired. The hidden information may have the form of a digital watermark.

Checking the validity of the hidden information may be based on any kind of calculation using both the hidden information 4 and the authentication data in the card memory 9.

Figure 4:
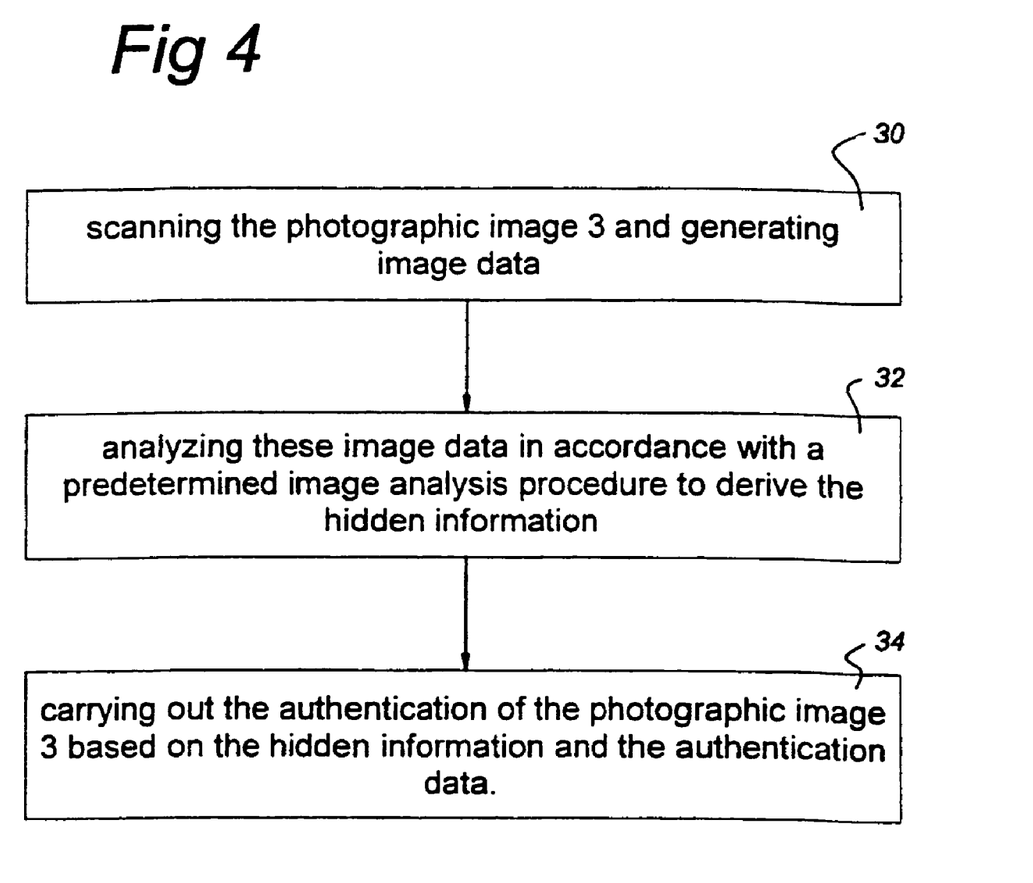
FIG. 4 shows a flow diagram of the method according to the invention.

As shown in FIG. 4, in order to allow for authentication, the card holder has to insert his or her smart card 1 into the opening 14 of the terminal 11. During insertion or after completing the insertion, the picture scanner 13 scans the photographic image 3, while interfaces 5 and 15 may communicate with one another. The orientation signs 2 may assist the picture scanner 13 in detecting where to search for the hidden information 4. The picture scanner 13 processes the photographic image 3 and generates image data which is sent to the processor 17, step 30.

The processor 17 digitally processes the received image data, as well as the authentication data stored in the card memory 9 in accordance with a predetermined program. In accordance with the predetermined program, which is preferably stored in memory 19, the processor 17 separates the hidden information 4 from the photographic image 3, step 32, and uses the hidden information 4 to establish the authenticity of the photographic image 3, step 34.

The authentication data received from the smart card 1 may be protected with any cryptographic means known to persons skilled in the art. Additionally, the data may be provided with a digital signature.

The authentication process carried out by the processor 17 may depend on the authentication data received from the smart card 1 in such a way that for different authentication data a different authentication process is carried out. This further enhances security.

In an alternative embodiment, instead of the processor 17 in the terminal 11, the card processor 7 is arranged to carry out the authentication process. To that end, it receives the hidden information 4 by means of the terminal 11.

However, since the card processor 7 and its memory 9 will only have a limited capacity, in practice, it will be preferred that both the processor 17 of the terminal 11 and the card processor 7 carry out part of the authentication process. The card processor 7 may, for instance, perform a final authentication step of the authentication process.

In a further embodiment the card memory 9 may be provided with credential data, i.e., data indicating predetermined actions the card holder is allowed to do, e.g., entering a building or an area, debitting an account, etc. In that case, the card processor 7 is, preferably, arranged to transmit these credential data to the processor 17 only when its own part of the authentication process has been carried out successfully. Thus, by receiving the credential data the processor 17 is informed that the authentication steps carried out by card processor 7 did not find any problems. When it does not receive the credential data the processor 17 knows that the authentication process has been unsuccessful.

To further enhance the security, the authentication data stored in card memory 9 may be related to one or more specific or general characteristics of the image 3 itself, like grey level, intensity distribution or image entropy. These parameters will be derived by the picture scanner 13 and transmitted to the processor 17. These parameters may be used by the processor 17 during the authentication process. However, in order to further enhance security, these parameters may be passed through the processor 17 to the card processor 7 which uses one or more of these parameters during carrying out its authentication steps.

Instead of the picture scanner 13 establishing the value of one or more of these parameters, these parameters may be digitally stored in the photographic image 3. The digitized value of these parameters may have been printed after being encoded. Before these digitized values of these parameters are added to the photographic image 3 they may be encoded.

In the embodiment described above, the terminal 11 is shown to include a memory 19. As is evident to persons skilled in the art memory 19 may comprise any kind of memory type like RAM, ROM, EPROM, EEPROM, etc. or any combination thereof. For the purpose of the present invention the memory 19 need not necessarily be physically located within the terminal 11.

Moreover, the processor 17 is shown to be one block. However, if preferred, the processor 17 may be implemented as several subprocessors communicating with one another each dedicated to perform a predetermined task. Preferably, the processor 17 is (or the subprocessors are) implemented as a computer with suitable software. However, if desired, they may be implemented as dedicated digital circuits.

The method in accordance with the present invention is preferably implemented by suitable software. This software may be distributed by data carriers like CDROM's or through the Internet or any other data communication medium.

The invention claimed is:

1. A method for authenticating an identification device including a memory, comprising:
    scanning a photographic image included on the identification device, the photographic image including hidden information;
    generating image data based on the scanned photographic image;
    analyzing the image data in accordance with a predetermined image analysis procedure to derive the hidden information; and
    providing the hidden information to a processor for verification of the photographic image based on said hidden information and authentication data stored in the memory.

2. The method of claim 1, wherein the method is performed by a terminal that communicates with the identification device.

3. The method of claim 2, wherein the memory includes credential data, and the method further includes:
    receiving the credential data following verification of the photographic image by the processor.

4. The method of claim 1, wherein the authentication data is associated with parameter data related to the photographic image, and wherein scanning the photographic image further includes:
    deriving the parameter data from the photographic image, and
    wherein providing includes:
    providing the parameter data to the processor.

5. The method of claim 4, wherein the processor verifies the photographic image based on said hidden information and the parameter data.

6. The method of claim 5, further including:
    performing a portion of the authentication of the identification device based on credential data received from the processor.

7. The method of claim 1, wherein the hidden information is steganographical hidden information.

8. A method performed by a system including a terminal device and an identification device including a photographic image, processor, and memory, the method comprising:
    performing, by the terminal device, a first portion of an authentication process for the identification device based on hidden information included in the photographic image; and
    performing, by the processor, a second portion of the authentication process for the identification device based on the first portion of the authentication process,
    wherein the authentication process verifies the photographic image such that the identification device is authenticated.

9. The method of claim 8, wherein the memory includes authentication data and wherein performing the first portion of the authentication process includes:
    performing the first portion of the authentication process based on the authentication data.

10. The method of claim 9, wherein the first portion of the authentication process varies based on different authentication data.

11. The method of claim 8, wherein performing the first portion of the authentication process includes:

scanning the photographic image included on the identification device to derive the hidden information; and
providing the hidden information to the processor.

12. The method of claim 11, wherein performing the second portion of the authentication process includes:
verifying, by the processor, the photographic image based on said hidden information and authentication data stored in the memory.

13. The method of claim 8, wherein the memory includes parameter data related to the photographic image, and wherein scanning the photographic image further includes:
deriving the parameter data from the photographic image, and
wherein providing includes:
providing the parameter data to the processor.

14. The method of claim 13, wherein verifying includes:
verifying, by the processor, the photographic image based on said hidden information and the parameter data.

15. The method of claim 8, wherein performing the first portion of the authentication process includes:
performing, by the terminal device, the first portion of the authentication process based on credential data received from the processor.

16. A system comprising:
an identification device including a photographic image including hidden information, a first processor, and a memory including authentication data; and
a terminal device including a second processor, an interface for communicating with the first processor, the terminal device deriving the hidden information from the photographic image and providing the hidden information to the first processor through the interface,
wherein the first processor verifies the photographic image based on the hidden information and the authentication data.

17. The system of claim 16, wherein the authentication data is associated with parameter data related to the photographic image, and wherein the terminal device derives the parameter data from the photographic image and provides the parameter data to the first processor.

18. The system of claim 17, wherein the first processor verifies the photographic image based on said hidden information and the parameter data.

19. The system of claim 17, wherein the memory includes credential data and the first processor provides the credential data to the terminal device when the first processor verifies the photographic image.

20. The system of claim 16, wherein the second processor performs a portion of an authentication process of the identification device based on credential data received from the first processor.

21. The system of claim 16, wherein the hidden information is steganographical hidden information.

22. A system including a terminal device and an identification device including a photographic image, the system comprising:

means for performing, in the terminal device, a first portion of an authentication process for the identification device based on hidden information included in the photographic image; and
means for performing, in the identification device, a second portion of the authentication process for the identification device based on the first portion of the authentication process,
wherein the authentication process verifies the photographic image such that the identification device is authenticated.

23. A method for authenticating an identification device embedded with a photographic image and including a processor and a memory, comprising:
receiving hidden information derived from a scanned image included on the identification device based on a predetermined image analysis process; and
verifying, by the processor, the photographic image based on said hidden information and authentication data stored in the memory.

24. The method of claim 23, wherein the method is performed by the identification device.

25. The method of claim 24, wherein the memory includes credential data, and the method further includes:
providing the credential data to an external system following verification of the photographic image by the processor.

26. The method of claim 23, wherein the authentication data is associated with parameter data related to the photographic image, and wherein the parameter data is derived from the photographic image.

27. The method of claim 26, wherein the verifying includes:
verifying the photographic image based on said hidden information and the parameter data.

28. The method of claim 27, further including:
providing credential data to an external system to enable the external system to perform a portion of the authentication of the identification device based on credential data.

29. The method of claim 23, wherein the hidden information is steganographical hidden information.

30. A smart card including:
a memory including authentication data; and
a processor configured to receive hidden information derived from a scanned photographic image included on the smart card based on a predetermined image analysis process and verify the photographic image based on said hidden information and the authentication data.

* * * * *